(12) United States Patent
Abali et al.

(10) Patent No.: US 9,158,712 B2
(45) Date of Patent: *Oct. 13, 2015

(54) INSTANTANEOUS SAVE/RESTORE OF VIRTUAL MACHINES WITH PERSISTENT MEMORY

(71) Applicant: International Business Machines Corporation, Armonk, NY (US)

(72) Inventors: Bulent Abali, Tenafly, NJ (US); Mohammad Banikazemi, New York, NY (US); John A. Bivens, Ossining, NY (US); Michael R. Hines, Ossining, NY (US); Dan E. Poff, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

This patent is subject to a terminal disclaimer.

(21) Appl. No.: 13/748,944

(22) Filed: Jan. 24, 2013

(65) Prior Publication Data

US 2014/0195721 A1    Jul. 10, 2014

Related U.S. Application Data

(63) Continuation of application No. 13/736,456, filed on Jan. 8, 2013.

(51) Int. Cl.
*G06F 12/16* (2006.01)
*G06F 12/02* (2006.01)
*G06F 12/08* (2006.01)

(52) U.S. Cl.
CPC ............ *G06F 12/16* (2013.01); *G06F 12/0238* (2013.01); *G06F 12/0804* (2013.01)

(58) Field of Classification Search
USPC .......................................................... 711/111
See application file for complete search history.

(56) References Cited

U.S. PATENT DOCUMENTS

| | | | |
|---|---|---|---|
| 6,854,115 | B1 | 2/2005 | Traversat et al. |
| 7,818,610 | B2 | 10/2010 | Rogers et al. |
| 8,001,342 | B2 | 8/2011 | Armstrong et al. |
| 8,219,990 | B2 | 7/2012 | Khanna |
| 2006/0248107 | A1 | 11/2006 | Coronado et al. |
| 2010/0306764 | A1 | 12/2010 | Khanna |
| 2011/0307665 | A1 | 12/2011 | Rudelic et al. |
| 2012/0017027 | A1 | 1/2012 | Baskakov et al. |
| 2012/0017052 | A1 | 1/2012 | Sauber |
| 2012/0084496 | A1 | 4/2012 | Rudelic et al. |
| 2012/0137044 | A1 | 5/2012 | Boldyrev et al. |

OTHER PUBLICATIONS

Nrayanan, et al., "Whole-System Persistence", Microsoft Research, Cambridge, ASPLOS'12, ACM London, England, UK, Mar. 3-7, 2012, pp. 1-10.

(Continued)

*Primary Examiner* — Matthew Bradley
(74) *Attorney, Agent, or Firm* — Yee & Associates, P.C.; Jennifer R. Davis

(57) ABSTRACT

A computer implemented method creates a snapshot of a logical volume of a computer. The computer stores a system state of the computer in persistent memory. The computer flushes a cache of the computer. The computer identifies a preceding snapshot. In response to identifying the preceding snapshot, the computer hardens changes occurring after the preceding snapshot. The computer then switches from a first indirection table to a second indirection table.

6 Claims, 5 Drawing Sheets

(56) References Cited

OTHER PUBLICATIONS

Moraru, et al., "Persisted, Protected and Cached: Building Blocks for Main Memory Data Stores", Carnegie Mellon University, Dec. 2011, pp. 1-24.

U.S. Appl. No. 13/736,456, filed Jan. 8, 2013, 31 pages.

Office action dated Mar. 27, 2015, regarding U.S. Appl. No. 13/736,456, 20 pages.

Mell et al., "The NIST Definition of Cloud Computing (Draft)," Recommendations of the National Institute of Standards and Technology, Special Publication 800-145, U.S. Department of Commerce, Jan. 2011, 7 pages.

Notice of Allowance dated Jul. 16, 2015, regarding U.S. Appl. No. 13/736,456, 12 pages.

INSTANTANEOUS SAVE/RESTORE OF VIRTUAL MACHINES WITH PERSISTENT MEMORY

This application is a continuation of U.S. patent application Ser. No. 13/736,456 filed Jan. 8, 2013, status pending.

BACKGROUND

1. Field

The disclosure relates generally to a computer system, computer implemented method, and computer program product for creating snapshots of a storage device. More specifically, the disclosure relates to a computer system, computer implemented method, and computer program product for creating snapshots of a wear-leveling storage device using a plurality of indirection tables.

2. Description of the Related Art

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

SUMMARY

According to one embodiment of the present invention, a computer implemented method is provided for creating a snapshot of a logical volume of a computer. The computer stores a system state of the computer in persistent memory. The computer flushes a cache of the computer. The computer identifies a preceding snapshot. In response to identifying the preceding snapshot, the computer hardens changes occurring after the preceding snapshot. The computer then switches from a first indirection table to a second indirection table.

DETAILED DESCRIPTION

Figure 1:
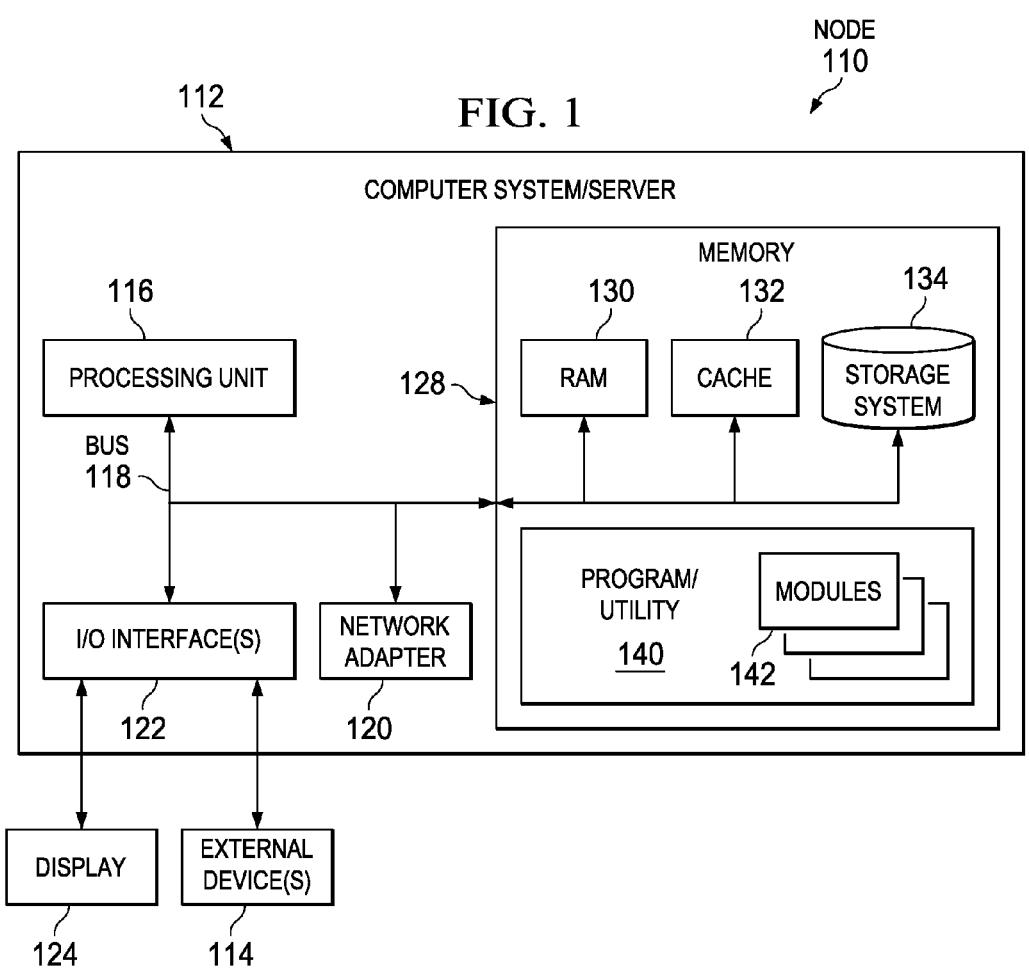
FIG. 1 is a schematic of an example of a cloud computing node shown according to an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 110 is only one example of a suitable cloud computing node and is not intended to suggest any limitation as to the scope of use or functionality of embodiments of the invention described herein. Regardless, cloud computing node 110 is capable of being implemented and/or performing any of the functionality set forth hereinabove.

In cloud computing node 110 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 10 is shown in the form of a general-purpose computing device. The components of computer system/server 112 may include, but are not limited to, one or more processors or processing unit 116, a system memory 128, and a bus 118 that couples various system components including system memory 128 to processor unit 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
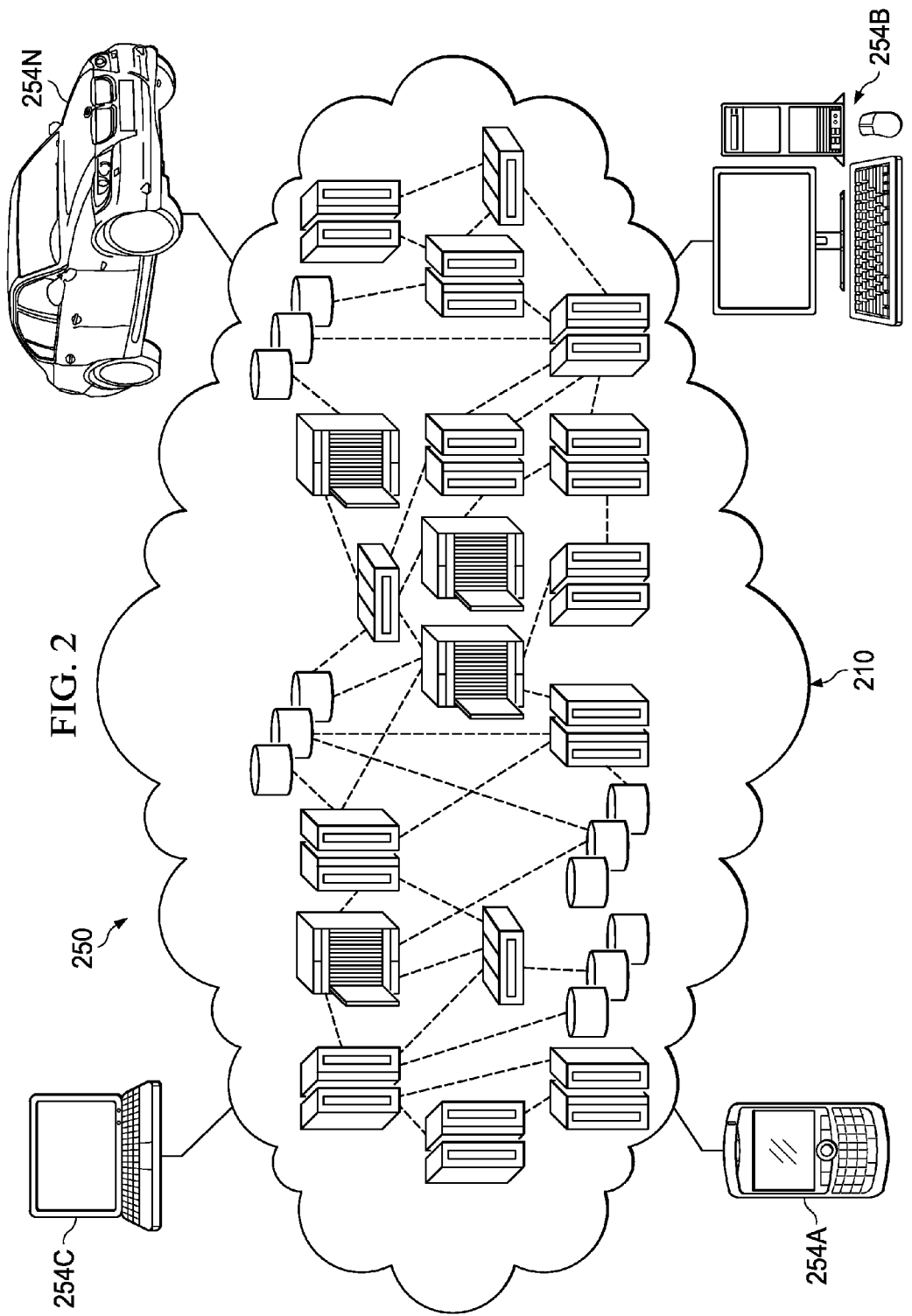
FIG. 2 is an illustrative cloud computing environment according to an illustrative embodiment.

Referring now to FIG. 2, illustrative cloud computing environment 250 is depicted. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
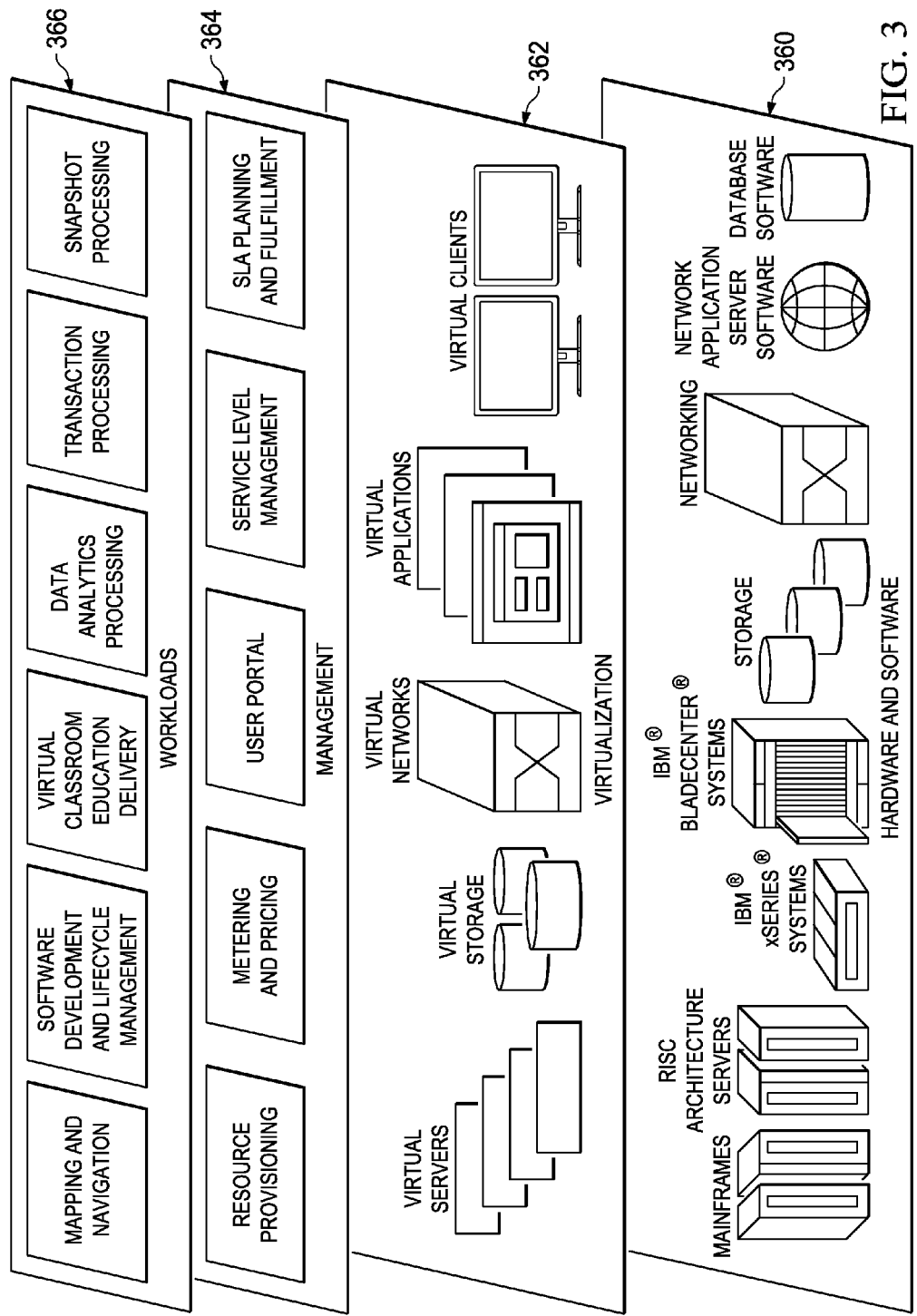
FIG. 3 is a set of functional abstraction layers provided by cloud computing environment according to an illustrative embodiment.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

In one example, management layer 364 may provide the functions described below. Applications, including all of the application components that comprise the application, are typically deployed to a common nodes or virtual machines within a cloud infrastructure. Thus, each instance of an application will contain each application component required for execution of the application.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and snapshot processing.

Thus, illustrative embodiments of the present invention provide a computer implemented method, computer system, and computer program product for creating a snapshot of a logical volume of a computer. The computer stores a system state of the computer in persistent memory. The computer flushes a cache of the computer. The computer identifies a preceding snapshot. In response to identifying the preceding snapshot, the computer hardens changes occurring after the preceding snapshot. The computer then switches from a first indirection table to a second indirection table.

Figure 4:
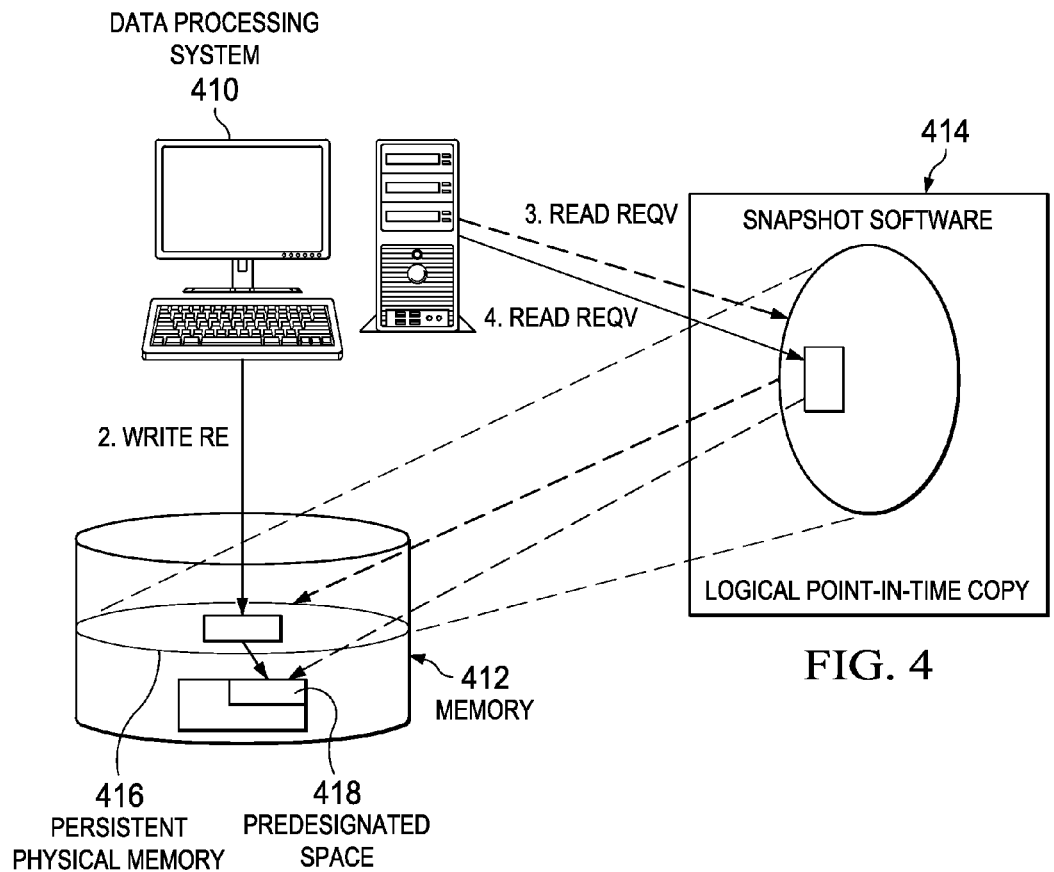
FIG. 4 is a data flow diagram for recording a snapshot according to a copy-on-write methodology according to an illustrative embodiment.

Referring now to FIG. 4, a data flow diagram for recording a snapshot according to a copy-on-write methodology is shown according to an illustrative embodiment. Data processing system 410 is data processing system such as computer system/server 12 of FIG. 1. Memory 412 is a memory such as such as random access memory (RAM) 130 and/or cache memory 132 of system memory 128 of FIG. 1.

Snapshot software 414 is software for recording snapshot of memory 412. When a snapshot is taken, snapshot software 414 records the state of memory 412, and preserves that snapshot as a guide for restoring memory 412 in the event that it fails. Thus, a snapshot created by snapshot software 414 creates a point-in-time copy of the data on memory 412.

In a copy-on-write methodology, snapshot software 414 creates a snapshot of persistent physical memory 416 at pre-designated space 418. When snapshot software 414 first creates the snapshot, the snapshot comprises only meta-data designating the location of memory 412 is stored in pre-designated space 418 within memory 412. That is, snapshot software 414 does not copy any original data from memory 412 into pre-designated space 418.

When a write or page in/page out to memory 412 is attempted, snapshot software 414 copies changing blocks from memory 412 into pre-designated space 418. Thus before original data is overwritten, original data in memory 412 that is being written to is copied into pre-designated space 418.

The copy-on-write methodology copies the original data block or page of memory 412 to pre-designated space 418 of the snapshot before a write or page in/page out is allowed to the original data block of memory 412. Copy-on-write methodology therefore maintains snapshot data in pre-designated space 418 consistent with the time at which the snapshot was taken.

The copy-on-write methodology provides a backup that is space efficient. Because read requests for unchanged data are satisfied from the original volume, the storage required to create a snapshot is minimal, containing only that data that is changed.

Figure 5:
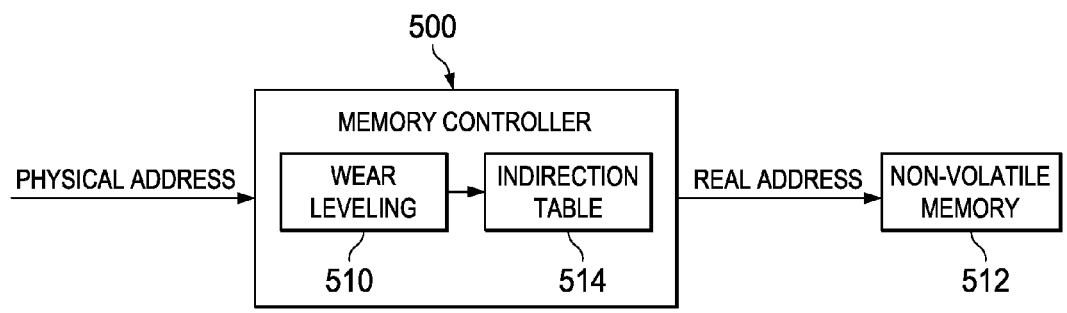
FIG. 5 is a data flow for hardware-based wear-leveling according to an illustrative embodiment.

Referring now to FIG. 5, a data flow for hardware-based wear-leveling is shown according to an illustrative embodiment. Memory controller 500 is a digital circuit that manages the flow of data going to and from the main memory. Memory controller 500 may be present in a memory or cache, such as memory 128 of FIG. 1. Memory controller 500 may contain a memory or cache, such as memory 128 of FIG. 1.

Memory controller 500 includes wear-leveling 510. Wear-leveling 510 is a process for distributing write/erase cycles evenly among all of the blocks in non-volatile memory 512. Non-volatile memory 512 is a memory such as such as random access memory (RAM) 130 and/or cache memory 132 of system memory 128 of FIG. 1. Non-volatile memory 512 can be, for example but not limited to NAND type flash memories, NOR type flash memories, Phase Change Memory, Spin Torque Transfer RAM, and memristor. By distributing write/erase cycles evenly among all of the blocks in non-volatile memory 512, memory controller 500 extends the useful life of non-volatile memory 512 before wearout occurs.

To track the location of data within nonvolatile memory 512, memory controller 500 includes indirection table 514. Indirection table 514 is a table or other data structure that tracks indirection between physical memory addresses and real addresses at which data is actually stored. When memory controller 500 receives a read/write to data at a physical memory address, memory controller 500 utilizes indirection table 514 to translate the physical memory address of a call to a real memory address with in a non-volatile memory 512.

Figure 6:
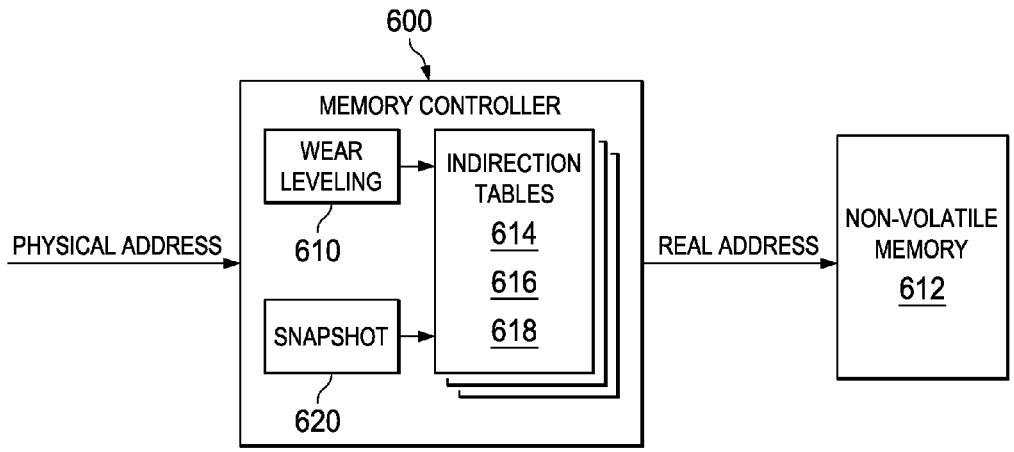
FIG. 6 is a data flow implementing a snapshot methodology for hardware-based restoration and recovery according to an illustrative embodiment.

Referring now to FIG. 6, a data flow implementing a snapshot methodology for hardware-based restoration and recovery is shown according to an illustrative embodiment. Memory controller 600 is a memory controller such as memory controller 500 of FIG. 5.

Memory controller 600 includes wear-leveling 610. Wear-leveling 610 is a process similar to wear-leveling 510 of FIG. 5. However, wear-leveling 610 allows memory controller 600 to implement restoration and recovery utilizing a plurality of indirection tables stored in non-volatile memory 612.

Memory controller 600 includes a plurality of indirection tables, such as indirection table 614, indirection table 616, and indirection table 618. Indirection tables 614, 616, and 618 are for explanation purposes. One skilled in the art recognizes that memory controller 600 can utilize more or fewer indirection tables without departing from the scope herein described.

Memory controller 600 works in conjunction with snapshot 620. Snapshot 620 is a snapshot software, firmware, or other code that implements a snapshot in process similar to snapshot software 414 of FIG. 4.

When snapshot 620 creates a new snapshot, memory controller 608, atomically switches to a new one of the plurality of indirection tables. Memory controller 608 does not overwrite the real memory locations where data is stored. Therefore, each subsequent one of indirection table 614, indirection table 616, and indirection table 618 provide a check pointed version for nonvolatile memory 612.

Each of the plurality of indirection tables can be implemented using a copy on write methodology. When snapshot 620 creates a snapshot of nonvolatile memory 612, memory controller 600 switches from indirection table 614 to indirection table 616. Memory controller 608 does not overwrite the real memory locations where data is stored. When snapshot 620 creates a subsequent snapshot of nonvolatile memory 612, memory controller 600 switches from indirection table 616 to indirection table 618. Memory controller 608 does not overwrite the real memory locations where data is stored. Returning to a previous indirection table therefore allows quick recovery and restoration of a previous state of nonvolatile memory 612.

Figure 7:
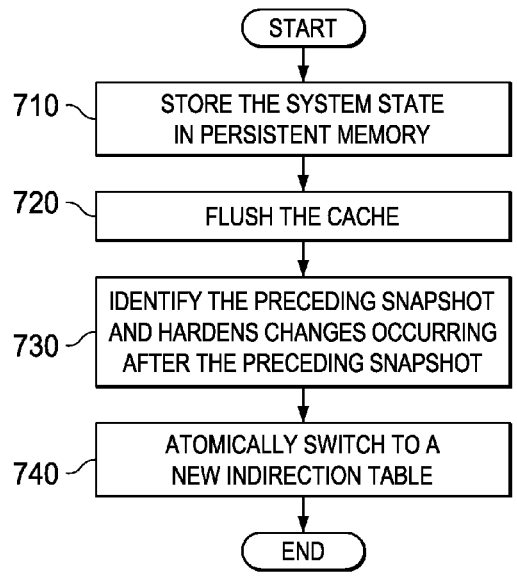
FIG. 7 is a flowchart for creating a snapshot of nonvolatile memory according to an illustrative embodiment.

Referring now to FIG. 7, a flowchart for creating a snapshot of nonvolatile memory is shown according to an illustrative embodiment.

When a snapshot is created, Process 700 begins by storing the system state in persistent memory (step 710). The system state is the stored information, at a given point in time, which is used by the circuit or program. The output of a digital circuit or computer program at any time is completely determined by its inputs and its state. The persistent memory can be for example non-volatile memory 612 of FIG. 6.

Process 700 flushes the cache (step 720). Hushing removes all items in the cache, including those that have not yet expired. The cache can be, for example, cache memory 132 of FIG. 1.

Process 700 identifies the preceding snapshot and hardens changes occurring after the preceding snapshot (step 730). Hardening the changes occurring after the preceding snapshot comprises committing those changes to persistent memory, such as for example nonvolatile memory 612 of FIG. 6. In one illustrative embodiment, process 700 hardens changes occurring after the preceding snapshot by switching to the latest version of copy on write pages. Process 700 switches to the latest version of copy on write pages by utilizing redo/undo logs. Utilizing the redo log, process 700 takes a forward pass over the log, redoing all updates that were not hardened in the preceding snapshot. Utilizing the undo log, process 700 takes a backward pass over the log, undoing all updates for transactions in the undo log.

Process 700 atomically switches to a new indirection table (step 740), with the process terminating thereafter. The new indirection table can be, for example, one of indirection tables 614, 616, or 618 of FIG. 6. A memory controller, such as memory controller 608 of FIG. 6, does not overwrite the real memory locations where data is stored. Therefore, each subsequent indirection table provides a check pointed version for the nonvolatile memory. The memory controller is able to switch to a previous checkpoint by reverting to a previous indirection table.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for creating a snapshot of a logical volume of a computer, the computer implemented method comprising:
   storing, by the computer, a system state of the computer in persistent memory;
   flushing, by the computer, a cache of the computer;
   identifying, by the computer, a preceding snapshot;
   responsive to identifying the preceding snapshot, hardening, by the computer, changes occurring after the preceding snapshot; and
   switching, by the computer, from a first indirection table to a second indirection table, wherein real memory locations referenced by the first indirection table are not overwritten while utilizing the second indirection table, and wherein the second indirection table is implemented using a copy on write methodology from the first indirection table.

2. The computer implemented method of claim 1, wherein the persistent memory is a non-volatile memory implementing a wear-leveling process.

3. The computer implemented method of claim 2, wherein the non-volatile memory is selected from a group consisting of NAND type flash memories, NOR type flash memories, Phase Change memories, Spin Torque Transfer RAM memories, and memristor memories.

4. The computer implemented method of claim 2, further comprising:
   restoring, by the computer, to a previous state of the non-volatile memory, wherein the restoring to the previous state comprises switching from the second indirection table to the first indirection table.

5. The computer implemented method of claim 2, further comprising:
   restoring, by the computer, to a previous state of the non-volatile memory, wherein the restoring to the previous state consists of switching from the second indirection table to the first indirection table.

6. The computer implemented method of claim 1, further comprising:
   switching, by the computer, from the first indirection table to the second indirection table, wherein the switching is performed by a hardware memory controller.

* * * * *